June 25, 1968         A. E. EAGLES ET AL         3,389,951
DIFFUSE REFLECTOR INCORPORATING WIRE MESH STRUCTURE
Filed July 1, 1963
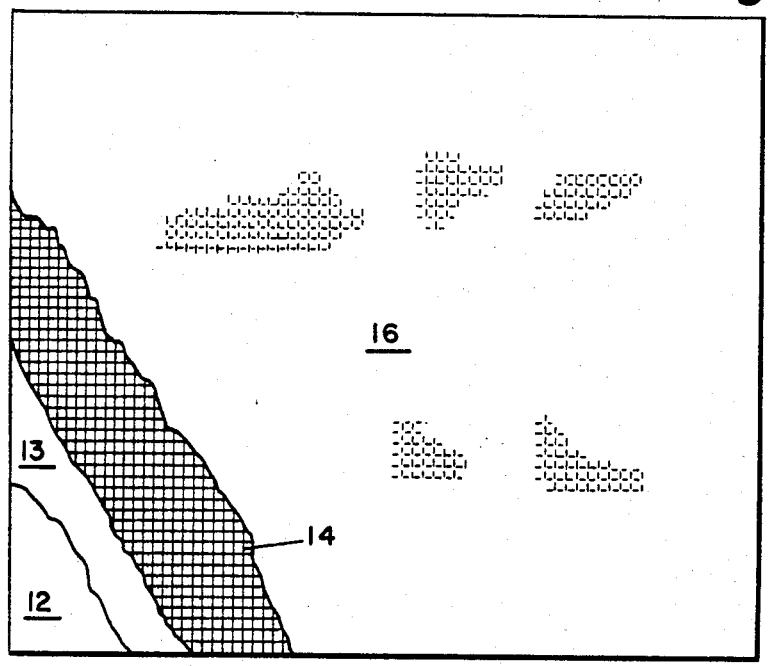
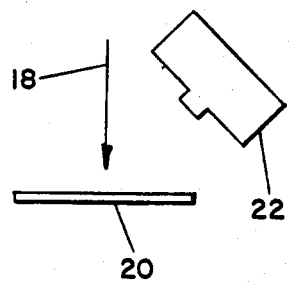
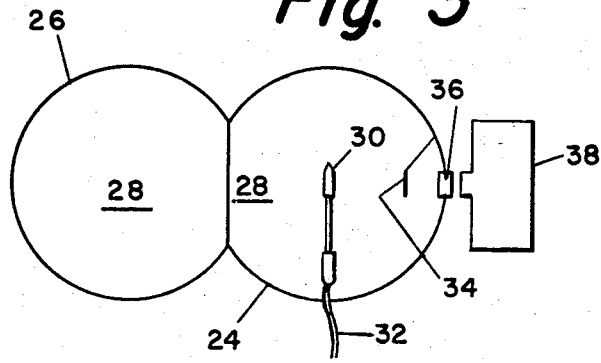
INVENTORS.
ALLEN E. EAGLES
BY BERND LINDER
Henry W. Kaufmann
AGENT

United States Patent Office 3,389,951
Patented June 25, 1968

3,389,951
DIFFUSE REFLECTOR INCORPORATING
WIRE MESH STRUCTURE
Allen E. Eagles, Latham, N.Y., and Bernd Linder,
Broomall, Pa., assignors to General Electric Company, a corporation of New York
Filed July 1, 1963, Ser. No. 291,872
3 Claims. (Cl. 350—292)

This invention pertains to diffusing reflectors for radiation in the general optical range of frequencies, and more particularly that in the infrared range, below the range of visible frequencies.

It is well-known in the optical art that a perfectly diffusing reflector, receiving radiation at any angle, reflects it in various directions with an energy proportional to the cosine of the angle between the direction and a normal to the surface of the reflector. Such a perfectly diffusing surface has the characteristic that, when it is viewed at any angle whatever from the illuminated side, it appears to have the same brightness, or energy per unit of projected area. This is true because the projected area seen by a viewing observer is equal to the true area divided by the cosine of the angle between the direction of viewing and the normal to the surface. Thus the cosine function cancels out of the expression for the brightness observed. In the visible region this property of diffusing reflectors has been employed, as in the Macbeth illuminometer, to measure the energy density incident upon a diffuse or Lambert reflector of known reflectivity by exposing such a reflector to the incident radiation, and then measuring its observed brightness. Another, probably even more widely utilized, use of the property of diffuse reflectors is an an internal coating in Ulbricht or radiation-integrating spheres. These spheres have the characteristic that, when a source of radiation is enclosed by such a sphere, a spot on the interior of the sphere which is shaded from direct radiation from the source is illuminated with a brightness which is proportional to the total output, in all directions of the source of radiation. The integrating sphere, for this reason has been widely used for many years to measure the total lumen output of sources of visible light.

Unfortunately, while reflectors which approximate the Lambert or cosine law adequately in the visible region are known, the art known prior to our invention did not afford surfaces of high reflectivity which obeyed the cosine law adequately in the infrared region, e.g., out to 25 microns or 250,000 Angstroms. Many metals are known which reflect infrared adequately, but it is a general characteristic of metals that their reflection is specular; indeed, the most common mirrors employ metal surfaces. We have found a structure which, when coated with metals of such thickness that they reflect specularly, produces an overall reflection which is cosine in its distribution. This structure consists basically of a fine wire mesh fastened to a smooth surface, the structure being coated with metal which has high reflectivity in the infrared region. Such a structure may be formed in a flat plane to permit use in the infrared region analogous to the use of the flat (conventionally magnesium carbonate) diffusing reflector of the Macbeth illuminometer; but it may also be formed as a lining in an integrating sphere to permit comparative measurements of the total infrared output of thermal sources. While the use of our invention for measurement purposes is the one which comes most naturally to the mind of one skilled in the art, there are many other applications in which it is desirable to provide Lambert or cosine reflectors of high reflectivity, in the infrared region. It should be borne in mind that our invention is a *reflector*; it does not absorb infrared radiation, convert it into heat, and then radiate this energy from its own temperature rise. It therefore will diffusely reflect incident radiation without distorting its spectral distribution, except insofar as the reflectivity of the coating metal employed may not be uniform over the spectrum.

It is thus a general purpose of our invention to provide a structure of such geometry that it will, when coated with highly reflective material which is itself a specular reflector, produce diffuse or cosine reflection, with a high reflectivity. This achieves the more specific end of providing a highly reflective diffuse reflector operative in the infrared region, which may be utilized in the same manner as the diffuse reflectors of the prior art are used in the optical region.

For the better understanding of our invention, we have provided figures of drawing in which:

FIG. 1 represents a basic structure of a reflector according to our invention;

FIG. 2 represents a reflector according to our invention arranged for measurement of the incident density of infrared radiation; and FIG. 3 represents an integrating sphere lined with a reflecting surface according to our invention.

Referring to FIG. 1, there is represented a base 12, which is conveniently of plastic sheet to which is cemented by cement 13 a wire mesh or screen 14. This combination is covered with a coating 16 of material having a high reflectivity in the spectral region of interest. In particular embodiments of our invention base 12 was a sheet of the plastic material sold commercially under the trade name "Mylar," because this material is flexible, has good mechanical strength, and adheres well to available cements. However, the chemical composition of the material of base 12 is of no importance, except as it affects its physical properties. Indeed, if flexibility of the entire structure is not required, base 12 may be rigid and of metal, wood, plastic, or other material capable of being furnished with a smooth surface and of adhering to a cement 13 suitable for affixing mesh 14. Similarly, although mesh 14 in our embodiments was made of aluminum wire, there is no reason why any material capable of being woven into a mesh of similar geometry and of receiving a coating 16 should not suffice. The coating 16 in our embodiments was applied by vacuum evaporation, and was of either aluminum or gold; these materials were chosen as examples of metals highly reflective in the spectral range of interest. In view of the mode of application, it is evident that coating 16 was deposited on base 12 (or cement layer 13) chiefly upon the unobstructed portions thereof, i.e., upon the parts not masked by mesh 14. (It will be recognized that depositions will occur directly upon base 12 if the cement 13 is applied only to mesh 14 prior to joining 12 and 14; but if cement 13 is applied to the entire surface of base 12 prior to joining 12 and 14, deposition of coating 16 will actually occur upon the layer of cement 13. Since the cement is a purely casual mechanical aid, reference will be made hereinafter to base 12 as including by implication the alternative layer of cement 13.)

We have found it convenient, in our demonstrations, to employ wire mesh of 100 or 150 wires per linear inch, with wire diameters varying from approximately the linear dimension of the opening between the wires to one-half of that opening. It is evident that it is required to avoid having such wide mesh openings that the effect of having the mesh present becomes negligible. The wavelength of 250,000 Angstroms is about one one-thousandth of an inch, so that the wire mesh wire spacing is about ten wavelengths, and the wire diameters and openings are on the order of five wavelengths. It is evident that these dimensions are slightly too large to produce any marked interference or other similar effects, but small enough to produce an approximation to uniformity of surface when observed from a moderate distance. Since the reflective properties of our structure have also been tested at wavelengths of less than a tenth of the 250,000 Angstroms which have been here used as the basis of calculation, it is evident that our invention can function when its dimensions are of the order of over a hundred wavelengths. It thus appears that the maximum permissible mesh size is determined by the distance from which the reflector is to be observed, being required to be below the limits of effective resolution of the observing means. We have employed the following mesh sizes and wire sizes in embodiments which we have preferred for our particular uses.

| Mesh size, in wires per linear in.: | Wire dia., in thousandths of an in. |
|---|---|
| 100 | 4.5 |
| 105 | 3.0 |
| 120 | 3.7 |
| 145 | 2.2 |
| 150 | 2.6 |

It will be observed that in these cases the nominal linear dimension of the opening between successive wires was approximately equal to the wire diameter, being somewhat larger in every case, ranging from approximate equality to the wire diameter to twice the wire diameter.

In our physical embodiments, reflective material 16 (aluminum in some instances, and gold in others) was deposited by conventional vacuum evaporation to a thickness sufficient to eliminate interference colors and produce a specularly reflecting surface of the material.

While a particular mechanical substructure is here represented, it is obvious that the operatively significant features of our invention reside in the geometry which the mechanical substructure produces in the coating 16. It is clear that one might make a female molding of our structure and cast therein a plastic replica of our structure, which could then be given a coating 16, and would be an embodiment of our invention. Similarly, one might produce a female molding, making a mating male portion, and stamp metal sheet to form a surface reproducing an alternative embodiment of our invention.

A semantic problem arises in describing the particular surface we have produced. It is not any previously named geometrical figure. It is defined by a grid or mesh or network of substantially linear elements of circular cross section backed by or in lateral contact with a smooth surface of large radius of curvature. The term "lateral contact" appears adequate to define the relation of the mesh lying on the base in what would be colloquially called a "flat" position. The elements are only substantially linear, since in the embodiment we prefer for convenient fabrication the linear elements are necessarily distorted by the bending incidental to the passing of the woof over and under the warp. Also, since the structure represented in FIG. 1 is flexible and can be curved somewhat without destroying its function, the backing may most accurately be described as of large radius of curvature, since this comprehends both a plane surface and the result of curving such a surface. We have found by experiment that this structure produces a good cosine reflection characteristic. To give a specific example, we have illuminated specimens according to our preferred embodiment with energy in a band centered at 20 microns, or 200,000 Angstroms. With the incident energy normal to the surface, the brightness of the surface when observed at angles varying from normal to sixty-five degrees from the normal remained constant within three percent. The absolute magnitude was greater than eighty percent of that calculated for an ideal diffusing reflector.

FIG. 2 represents one use of our invention. Incident radiation represented by arrow 18 is intercepted by a reflector 20, according to our invention, the side exposed to the incident radiation 18 being that which corresponds to the upper layer 16 of FIG. 1. A radiation detector 22, which may conveniently be a total radiation pyrometer, is focussed upon the upper surface of reflector 20. The indication of detector 22 is a measure of the intensity of incident radiation 18; it is not sensitive to the angle at which detector 22 views reflector 20, because of the cosine characteristic of reflector 20.

FIG. 3 represents, separated in the open condition thereof, halves 24 and 26 of an Ulbricht sphere whose interior is covered with reflector 28 according to our invention. (The production of a flexible reflection assembly by the use of flexible plastic for base 12 as represented in FIG. 1 adapts our invention particularly well to such uses as the lining of spheres.) An infrared source 30, here represented as a soldering iron having a feed cord 32, is located in the center of the sphere, and is shielded by a baffle 34 from window 36 in the sphere wall, whose brightness in the infrared is measured by infrared energy measuring device 38. The indication of device 38 will, in accordance with the known art of radiation measurement by integrating spheres, be a measure of the total infrared output of source 30. The representation herein is completely analogous to the standard use of an Ulbricht sphere for photometric measurements of lumen output; but hitherto no perfectly diffusing highly reflector effective in the infrared has been available; despite its apparent conventionality, therefore, FIG. 3, like FIG. 2, in fact represents a procedure previously not possible, and rendered possible by the use of our invention.

While two specific uses of our invention have been represented by FIGS. 2 and 3, there are many other uses for a highly reflective truly diffusing reflector for the long-wave infrared region.

What is claimed is:

1. A diffusing reflector comprising:
 a flexible base having a surface of large radius of curvature;
 a woven mesh structure of metal wires of equal circular cross section, each said wire being spaced from the next adjacent wire parallel thereto by not less than one nor more than two diameters of the said wire, in contact with the said surface of the said base; and
 a reflective surface upon the said mesh structure and the said surface of the said base sufficiently thin to have an exposed surface substantially as defined by the said mesh structure and the side of the said base with which the said mesh structure is in contact.

2. A reflective structure as claimed in claim 1 in which the therein said metal wires are composed of two groups of which the wires in the first group are substantially at right angles to the wires in the second group.

3. A diffusing reflective structure having a reflective surface exposed to receive and reflect incident radiation and defined by:
 a rectangular wire mesh structure composed of two groups of linear wires in lateral contact with a surface of large radius of curvature, the wires in the first said group being substantially at right angles to the wires of the second said group, all the said wires being of substantially circular cross section, all the said wires being of the same diameter, the said diameter lying within the range between two and five one-thousandths of an inch, the spacing between the centers of adjacent wires in a same said group lying within the range between seven and ten one-thousandths of an inch.

References Cited

UNITED STATES PATENTS

| | | | |
|---|---|---|---|
| 1,568,023 | 12/1925 | McManus et al. | 88—105 |
| 1,659,897 | 2/1928 | Schoenfeld | 88—105 |
| 2,175,630 | 10/1939 | Kiesel | 240—103 |
| 2,756,424 | 7/1956 | Lewis et al. | 250—86 |
| 2,875,087 | 2/1959 | Crandon | 88—105 |
| 3,039,904 | 6/1962 | Stage | 88—105 |
| 3,042,561 | 7/1962 | Iwashita | 88—105 |

FOREIGN PATENTS

| | | |
|---|---|---|
| 1,045,332 | 6/1953 | France. |

DAVID H. RUBIN, *Primary Examiner.*

T. H. KUSMER, *Assistant Examiner.*